O. W. HANSON.
MACHINE FOR MAKING PAPER BOXES.
APPLICATION FILED SEPT. 3, 1912.

1,085,732.

Patented Feb. 3, 1914.
6 SHEETS—SHEET 1.

Witnesses:
Harry H. Reiss
George G. Anderson

Inventor,
by Hugh K. Wagner
His Attorney.

O. W. HANSON.
MACHINE FOR MAKING PAPER BOXES.
APPLICATION FILED SEPT. 3, 1912.

1,085,732.

Patented Feb. 3, 1914.

Witnesses:

O. W. Hanson, Inventor,
by His Attorney.

O. W. HANSON.
MACHINE FOR MAKING PAPER BOXES.
APPLICATION FILED SEPT. 3, 1912.

1,085,732.

Patented Feb. 3, 1914.

Witnesses:

O. W. Hanson,
Inventor,
by
His Attorney

O. W. HANSON.
MACHINE FOR MAKING PAPER BOXES.
APPLICATION FILED SEPT. 3, 1912.

1,085,732.

Patented Feb. 3, 1914.

Witnesses:
Harry H. Peiss.
George G. Anderson.

O. W. Hanson,
Inventor,
by Hugh K. Wagner
His Attorney

O. W. HANSON.
MACHINE FOR MAKING PAPER BOXES.
APPLICATION FILED SEPT. 3, 1912.

1,085,732.

Patented Feb. 3, 1914.

Witnesses:
Harry H. Pears.
George G. Anderson.

O. W. Hanson,
Inventor,
by Hugh K. Wagner,
His Attorney.

O. W. HANSON.
MACHINE FOR MAKING PAPER BOXES.
APPLICATION FILED SEPT. 3, 1912.

1,085,732.

Patented Feb. 3, 1914.

Witnesses:
Harry H. Peiss
George G. Anderson

O. W. Hanson, Inventor,
by Hugh N. Wagner
His Attorney.

UNITED STATES PATENT OFFICE.

OSCAR WILLIAM HANSON, OF TOPEKA, KANSAS, ASSIGNOR TO LOUIS A. ENGEL, OF ST. LOUIS, MISSOURI.

MACHINE FOR MAKING PAPER BOXES.

1,085,732.  Specification of Letters Patent.  Patented Feb. 3, 1914.

Application filed September 3, 1912. Serial No. 718,290.

*To all whom it may concern:*

Be it known that I, OSCAR W. HANSON, a citizen of the United States, residing at the city of Topeka, in the county of Shawnee and State of Kansas, have invented certain new and useful Improvements in Machines for Making Paper Boxes, of which the following is a specification.

The present invention relates to machines for making paper boxes and more particularly to machines designed for producing the enveloping portion of a sliding receptacle carton, the primary object of the present invention being the provision of a machine, which simultaneously feeds the blank forming the body of the box and the wrapper which is secured thereto by means of an adhesive, the adhesive strip being held in position for the reception of the blank, both to be projected to a rotating box-forming mandrel, which receives the forward edge of the blank and the adhesive strip and, in connection with a novel form of cam-operated mechanism, bends the blank to assume a hollow rectangular envelop while the blank is being fed forwardly, the inclosing adhesive strip continuing to be wrapped upon the stiff blank portion upon the retraction of the blank-feeding mechanism, so that a double thickness of adhesive strip is wound upon the envelop before the ejection or movement of the finished envelop from the mandrel.

A further object of the present invention is the provision of means, during the rotation of the mandrel and the formation of the blank and adhesive strip, for tucking in or folding the projecting edge of the adhesive strip, so that, when the completed article is moved from the forming portion of the mandrel, such folded or tucked in portion will be projected within the envelop to be held therein to form a finished edge at one end of the envelop.

A still further object of the present invention is to provide a novel form of blank-and-adhesive-strip feeding mechanism, whereby the blank is fed its full distance upon the forward stroke thereof, while the adhesive strip is fed both upon the forward and the retracting stroke, so that substantially double the length of adhesive strip is employed in each box envelop relatively to the length of the cardboard blank used for forming the stiff portion of the box envelop.

A still further object of the invention is the provision of the novel construction of actuating mechanism for severing the adhesive strip just prior to the projection of a new blank of cardboard, whereby the adhesive strip is in reality serrated transversely, in order to be torn by the rotation of the mandrel at the desired point, so that the completed article will have the adhesive strip folded in proper relation to the cardboard, so as to envelop the same and prevent any rough edges from protruding.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings forming part of this specification, in which like numbers of reference denote like parts wherever they occur.

In taking the case for detailed description, the same will be considered under four headings, namely—the frame, which includes the drive shaft, operating cams, and the blank-containing hopper; the blank-and-adhesive-paper-feeding mechanism; the blank-and-paper-guide-and-forming mechanism; and the paper-cutting mechanism.

Figure 2:
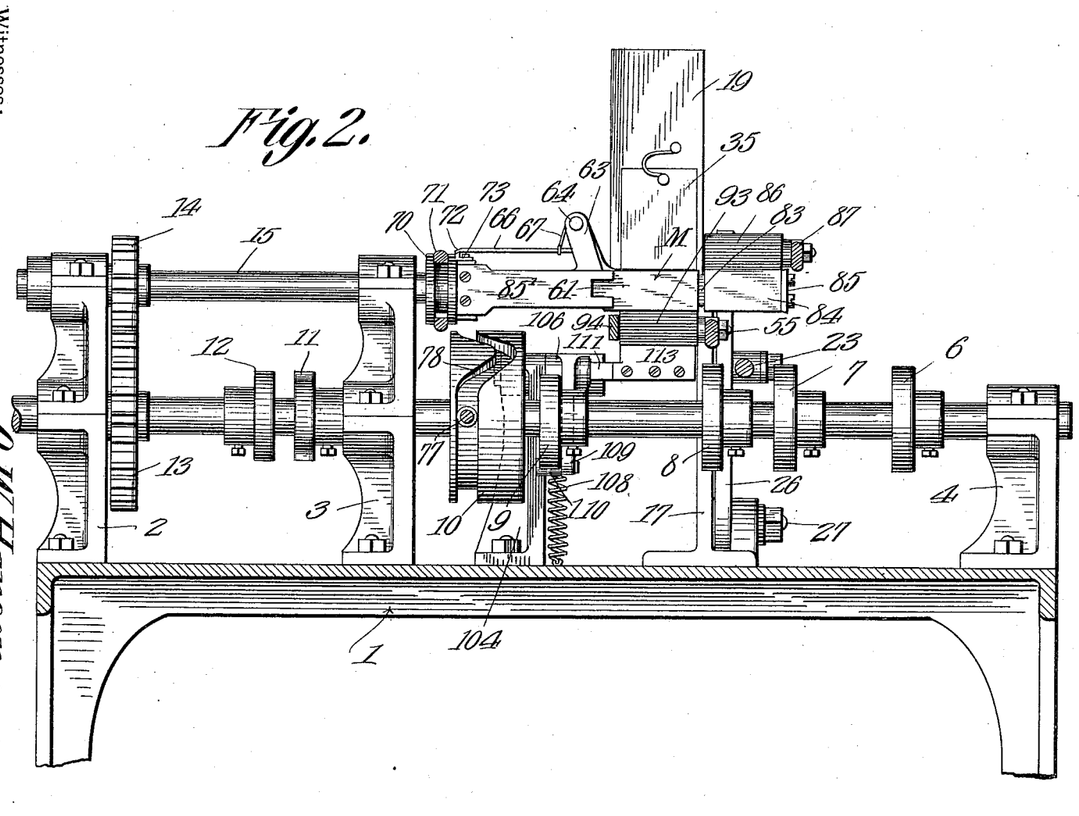
Fig. 2 is a longitudinal sectional view on line 2—2, Fig. 1.

*The frame.*—Referring to the drawings, the numeral 1 designates the main frame or support of the machine, which frame has mounted thereupon the three shaft-carrying supports or journals 2, 3, and 4, the two supports 2 and 3 being provided with two vertically alined journals, while the support 4 is provided with a single journal, whereby the main shaft 5 is properly supported in the lower journals of the two supports 2 and 3 and the only journal of the support 4, such shaft being disposed longitudinally of the machine and operated through any well known means preferably connected at the left end thereof as viewed in Fig. 2.

In order to operate the various mechanisms, mounted upon the main shaft are the respective cams 6, 7, 8, 9, 10, 11, and 12, thus operating all of such mechanisms directly from the main shaft, while keyed upon and rotatable with the main shaft is the large gear or pinion 13, which is preferably of twice the diameter of and meshes with the small gear or pinion 14, keyed upon the counter shaft 15, which is journaled in the upper journals of the two brackets or supports 2 and 3 and carries the mandrel M, the detailed description of which will appear later on.

Mounted upon the main frame to the rear of the shaft 5 and substantially centrally of the machine, is the supporting plate 17, to which is connected and carried the base plate 18, on which at its forward end adjacent to the mandrel M is carried the blank hopper 19, which contains the blanks B of cardboard or the like, said blanks being preferably scored at the points where same are to be folded and being cut to the proper length and so positioned within the hopper as to have the same fed one at a time from the bottom thereof, the weight 20 assisting in such feeding as will presently appear.

*Blank-and-adhesive-paper-feeding mechanism.*—This mechanism comprises, essentially, the reciprocatory lever or arm 21, which is pivoted in the lug 22 mounted upon the base plate 1 of the machine, the same being operably disposed and held in engagement with cam 7 by means of the spring 51, so that the rotation of the cam will impart the desired outward movement to the lever 21 to pull upon the rod 23 which is adjustably connected by means of the pin 24 in the elongated slot 25 of the blank-and-adhesive-strip-feeding lever 26. The lever 26 is fulcrumed at its lower end to the frame 17 as at 27, while its upper end is forked as at 28 and has adjustably mounted therein the pin 29 of the arm 30, said arm 30 being connected at 31 to the blank-and-adhesive-strip-feeding plate 32. This plate 32 is mounted for reciprocation between the guides of the base plate 18 and is provided with the reduced paper-blank-engaging end 33 having the abrupt shouldered portion 33' upon the upper face thereof, so that upon the forward movement of the plate 32 the lower blank B within the hopper 19 will assume the position as shown in Fig. 5 and be propelled through the aperture at the lower end of the hopper 19 and below the spring-depressed gate 35, whose lower end is chamfered as at 36 to permit the passage of the blank when propelled out of the hopper by the plate 32, but which upon the retraction of the plate 32 will snap downwardly to prevent the accidental passage of another blank, until the plate 32 has assumed the dotted line position as depicted in Fig. 5.

Figure 3:
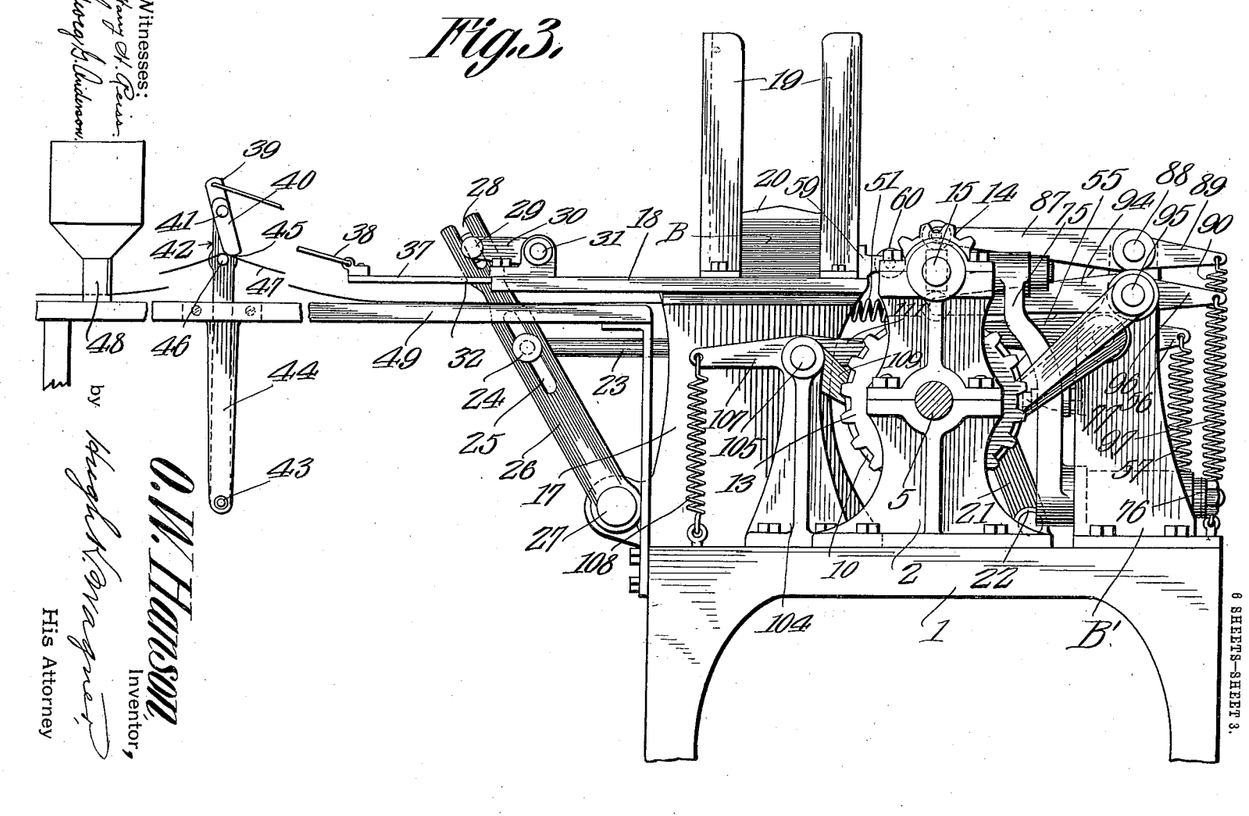
Fig. 3 is an end elevation with the power transmitting wheel removed, taken from the left as viewed in Fig. 1.

The rear extension 37 of the plate 32 has connected thereto the paper-feeding clamp-actuating plate 38, whose rear end is pivotally connected to the operating arm 39 of the pivoted paper-clamping arm 40, said arm 40 being connected at 41 to the upper free end of the lever 42, which as shown has its lower end pivotally connected at 43 to the lower end of the rigid support 44 carried by the paper-guiding plate 49. The pin 46 is carried by the arm 42 and is disposed for coaction with the lower curved end 45 of the strip-engaging clamp 40 upon the forward movement of the plate 32, the rearward movement thereof not only releasing said clamp, but, also, moving the arm 42 to the position as shown in Fig. 3. The strip of paper 47 is fed from any source below the adhesive-applying device 48 and over the pin 46 by the movement of the plate 32 forwardly, due to the engagement of the cam 7 to move the lever 21, thus moving the blank from the hopper and at the same time feeding the adhesive strip over the plate 49 through the guide 50 disposed below the base plate 18 and between the clamping rollers 58 and 60, the detailed description of which will appear later.

Figure 1:
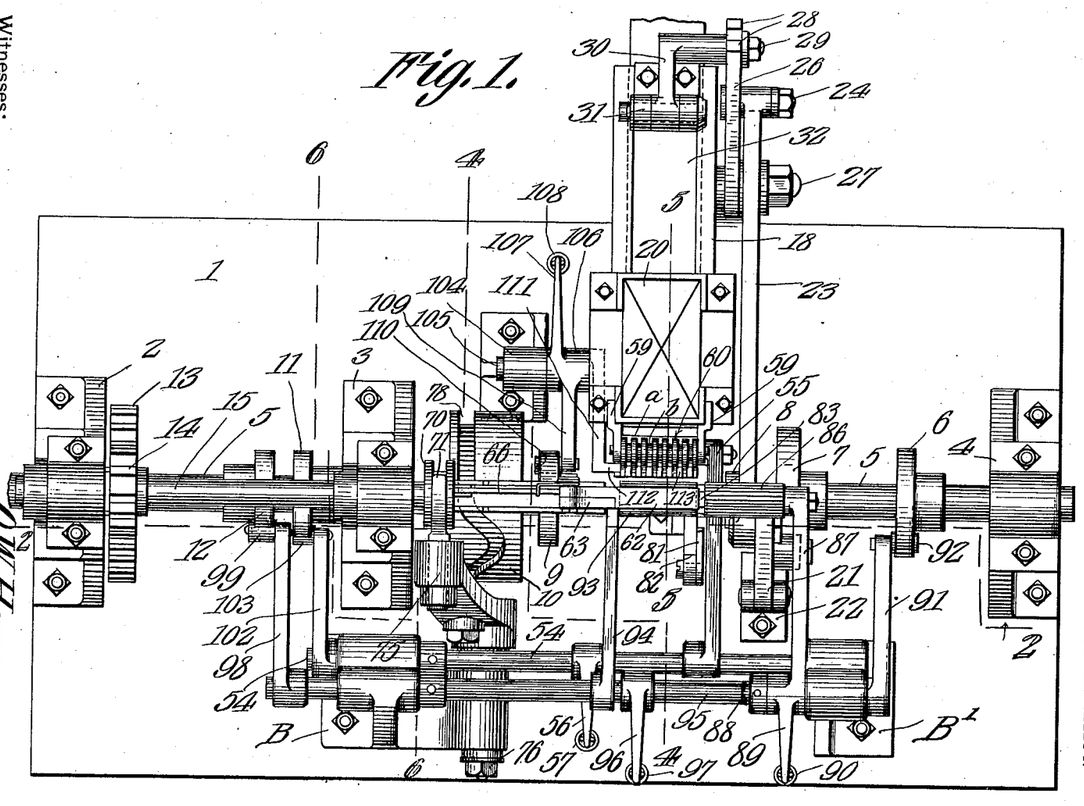
Figure 1 is a top plan view of the complete machine, the adhesive strip-engaging-and-feeding mechanism not being shown.

The spring 51, which holds the lever 21 in engagement at all times with the cam 7 and retracts the plate 32 to the position as shown in Fig. 1, is connected to the upper end of the lever 21 and by means of the eye 53 is connected to the standard or plate 17 of the frame of the machine. By this construction, it will be seen that the rotation of the shaft 5 will rotate the cam 7 and consequently impart the desired movement to the lever 21, the larger portion of the cam forcing the lever 21 from the position depicted in Fig. 1 to the position as shown in Fig. 5, this action as before stated feeding the lower blank B into the envelop or box-forming position and, simultaneously therewith, the adhesive strip 47, the retracting action of the lever 21 moving the plate 32 in the opposite direction to the dotted line position Fig. 5, simultaneously releasing the paper adhesive strip clamp 40, but permitting said strip to be moved and at the same time permitting the strip 47 to be pulled and wrapped upon the formed envelop upon the mandrel M, as will later appear.

Figure 5:
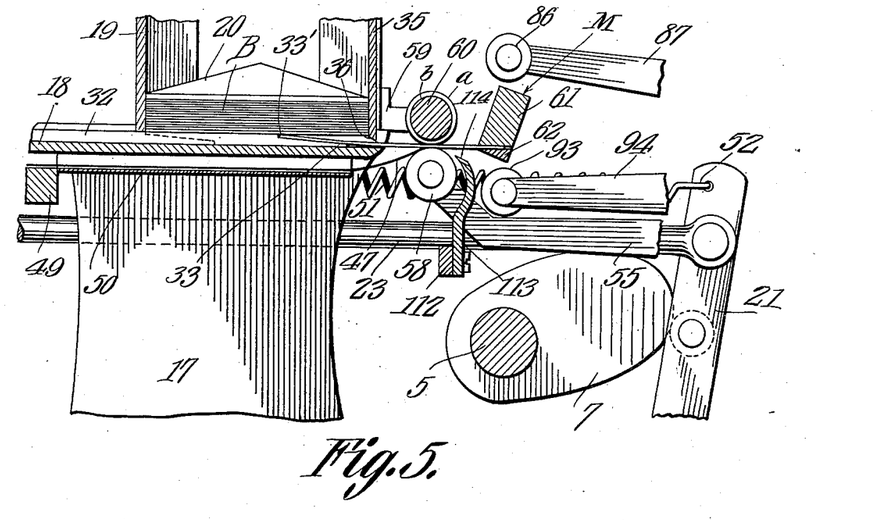
Fig. 5 is an enlarged detail sectional view on line 5—5, Fig. 1, the mandrel being in the position it assumes when initially receiving the blank adhesive strip.
Figure 6:
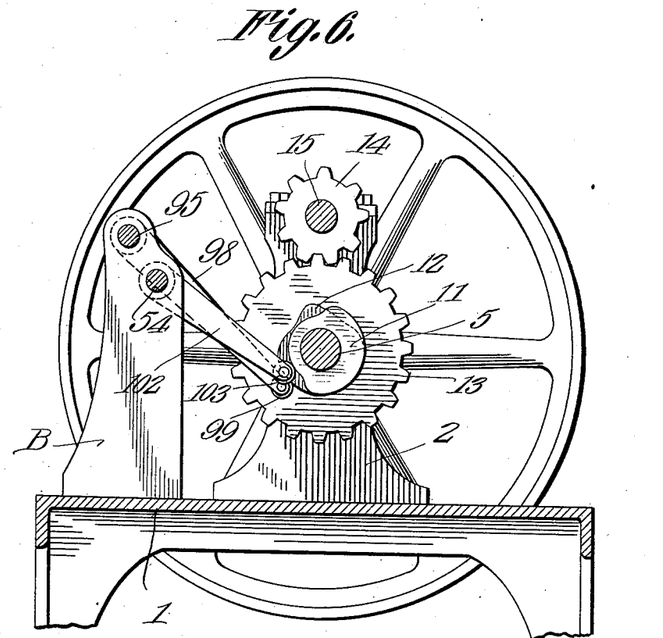
Fig. 6 is a sectional view on line 6—6, Fig. 1.

*Blank-and-Paper-Guide-and-Forming Mechanism.*—At the initial starting of the machine, the extreme end of the adhesive strip 47 normally rests between the rollers 58 and 60, so that upon the projection of the blank B from the hopper 19 by the feeding plate 32, the forward edge of said blank will be brought between said rollers 58 and 60 and by the impingement thereof will engage the end of the strip 47, the adhesive side thereof being disposed upwardly and thus being engaged by adhesion to the blank B and carried forwardly between said rollers to the mandrel M, the parts at this period being in the position as clearly shown in Fig. 5.

The lever or arm 55, which controls the actuation of the lower clamping roller 58, is keyed upon the shaft 54, which extends between the brackets B and B' and is the lowermost shaft. A radial arm 56 is rigidly secured to shaft 54 and is connected to the spring 57, which normally pulls arm 56 downwardly and consequently holds the roller 58 upwardly, the cam 11 carried upon the shaft 5 being the operating cam for the lever 55 as will later appear.

Connected to the forward end of the base-plate 18 adjacent to the outlet of the hopper 19 are the two brackets 59, between which is journaled the upper roller 60, the roller 60 being provided with the peculiarly shaped surface as clearly shown in Fig. 1, that is with a plurality of enlarged and reduced portions *a* and *b*, respectively, so as to provide the proper contact surface for the blank B and strip 47 during its projection thereof to the mandrel M, and at the same time not have sufficient surface to retain any too great amount of the adhesive from the strip 47, that might interfere with the feeding of the blank strip to said mandrel.

Figure 4:
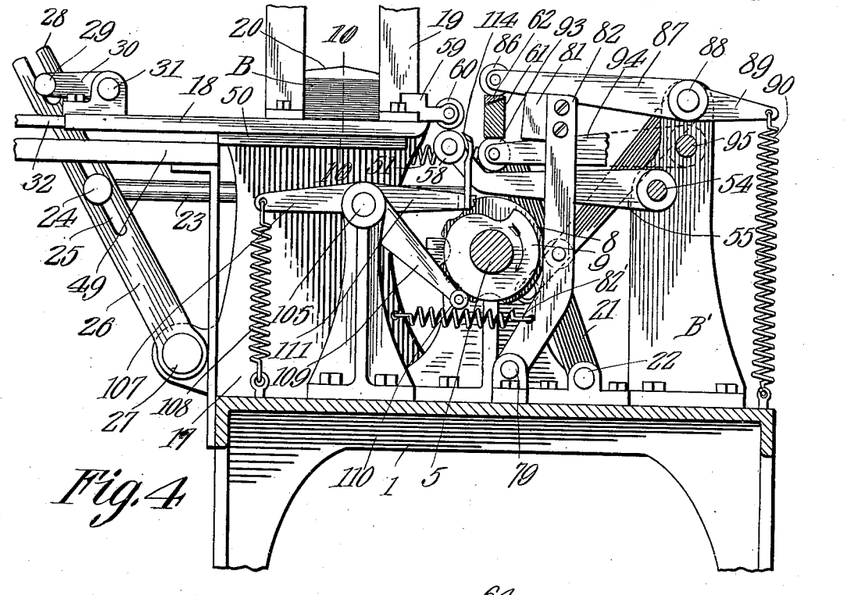
Fig. 4 is a sectional view on line 4—4, Fig. 1.
Figure 9:
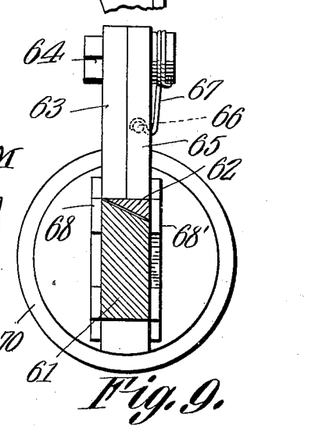
Fig. 9 is a sectional view on line 9—9, Fig. 8.

The mandrel M consists, primarily, of the main forming block 61, to which is pivoted the flat-engaging-and-clamping member 62, the adjacent faces of the same being cut at an angle as clearly shown in Figs. 4, 5, and 9, and providing, as before stated, when the mandrel is in the position as shown in Fig. 5, the receptacle for the forward projecting end of the blank B and strip 47, the mandrel being in such position to receive the edges at the initial projection of the blank and strip. The mandrel M is rotated continuously with the shaft 15, and, as the gear 14 is of substantially one-half the diameter of the gear 13, such shaft 15 is rotated at twice the speed of the shaft 5, so that the mandrel M is rotated two full revolutions during one reciprocation of the lever 21 and the paper-feeding plate 32.

Figure 8:
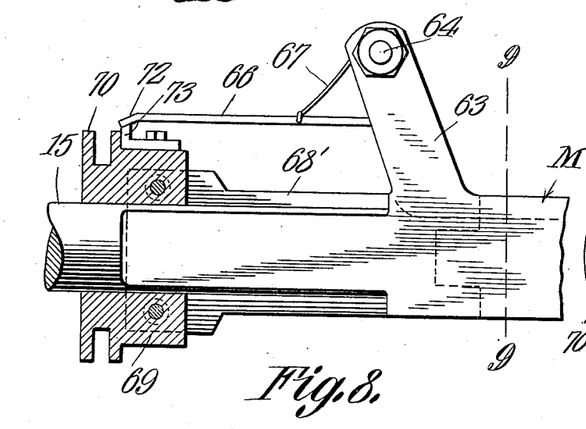
Fig. 8 is a side elevation of the mandrel adjacent to the envelop-ejecting mechanism, the sliding sleeve being shown in section.

Formed integrally with the mandrel is an inclined arm 63, which has a pin or journal 64 mounted in the upper end thereof to which is pivotally connected the arm 65, which carries the clamping portion 62 of the mandrel and permits the same to swing to and from the main portion 61 of the mandrel, to permit the insertion and withdrawal of the inner flap of the blank B and strip 47, at the initial projection of the same, and at its final movement from the forming portion of the mandrel. In order to impart such movement to the clamping member 62, an arm 66 is connected rigidly to the arm 65 and projects so that its free end 72 will engage lug or cam projection 73, such engagement, as viewed in Fig. 8, holding the clamping member 62 down upon the inserted portion of the blank and adhesive strip during the twirling of the mandrel and before the ejection of the finished blank from the forming portion of the mandrel. A spring 67 is preferably arranged to hold the free end 72 of the rod 66 down upon the cam 73, so that any depression of the free end thereof will permit the lifting of the clamping jaw 62 from the main portion 61 of the mandrel.

Figure 7:
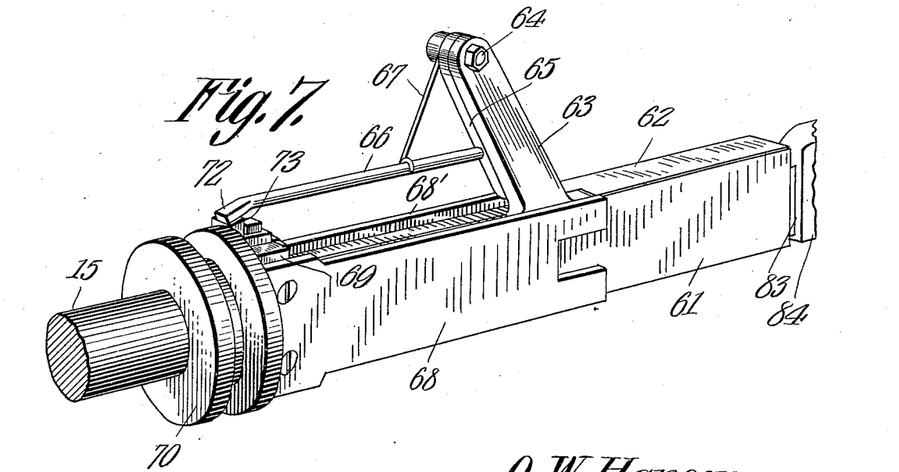
Fig. 7 is an enlarged detail perspective view of the main portion of the mandrel, showing the clamping mechanism and ejecting mechanism just prior to the ejecting of the finished envelop.

Slidably mounted upon the inner end of the shaft 15 adjacent to the mandrel M, is a spool 70 which carries the cam 73, the projection 69, and the two blank-ejecting plates 68 and 68', both of which plates are so mounted as to slide upon the wider portions of the mandrel M to assume the position as shown in Fig. 7 when the blank is being twirled upon the mandrel, or to be moved forwardly to project adjacent to the spacing slot 83 of the mandrel when ejecting the completed blank from the same upon the auxiliary-forming end 84 of the mandrel and before the final ejection thereof from the machine.

In order to operate the ejecting mechanism, and consequently operate the clamping portion 62 of the mandrel, a yoke 71 engages the spool 70 and is itself carried in the upper end of the arm 75, which arm is pivotally connected at 76 to the base plate of the machine. This arm 75 carries intermediate of its ends a pin 77, which rides within the cam groove 78 of the cams 10, such groove being so formed as to impart to the spool 70 at the proper time the movement from that shown in Fig. 7 to the finished blank-ejecting position as before stated, and just prior to the introduction of a new blank into the cutting portion of the mandrel it is returned to the position as shown in Fig. 7. Thus, the arm 75 will be oscillated or reciprocated longitudinally of the machine as viewed in Figs. 1 and 2.

In order that the adhesive strip 47 may be folded in so as to cover the respective ends of the blank when formed into the envelop, the said strip will be wider than the blank and when fitted upon the mandrel and twirled thereupon will have one edge projecting over the slotted portion 83, so that the folding blade 81 will be moved at the proper time, four times to each revolution of the shaft 15. This folding blade 81 is carried in the upper end of the operating lever 82 and is actuated by the cam 9, which is provided with a plurality of cam surfaces, so that four movements for every revolution of the shaft 5 are imparted to the upper free end of the lever 82 toward and from the mandrel M. This lever 82, as before stated, is pivoted to the main frame at 79 and is provided with a spring 82', which normally holds the lever into engagement with the cam surface, the folding blade 81, as clearly demonstrated in Fig. 11, being moved toward the mandrel by said spring and away therefrom by said cam. This movement is so timed that, when the straight sides of the mandrel are perpendicular to the base-plate of the machine, the folding blade 81 will be thrown into the groove 83 of the mandrel, and thereby crease the adhesive strip 47, as clearly illustrated in Fig. 11, so that, when the mandrel has been rotated two full revolutions, the four sides of the mandrel have been presented to the folding blade 81 and the edge of the strip 47 has been turned in.

Figures 10, 11, 12:
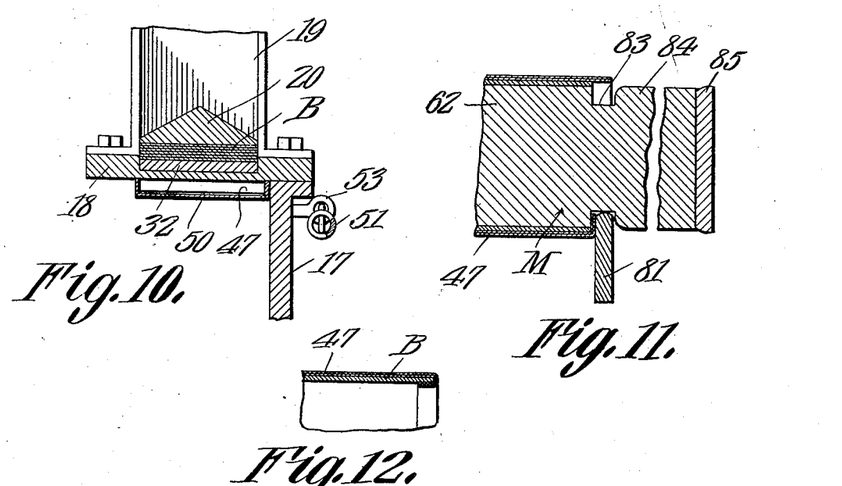
Fig. 10 is a sectional view on line 10—10, Fig. 4.
Fig. 11 is a detailed sectional view of a portion of the mandrel, with the creasing or folding blade in operable relation.
Fig. 12 is an enlarged detail sectional view through a portion of one of the box covers or envelops, showing the finished end after ejection from off the mandrel.

At the extreme right, as viewed in Fig. 2, the blank will have been projected in the slot 83, so that, when the ejector plates 68 and 68' have been moved to the right, as viewed in Fig. 7, the blank remaining upon the forming portions of the mandrel, consisting of the portions 61 and 62, will be moved to the right and upon the final forming portion 84 of the mandrel, which will project the right angled edges turned in by the folding knife 81 and, as viewed in Fig. 12, so that the blank will rest upon the portion 84 of the mandrel, and by the next succeeding blank will be forced over the enlarged end 85, which slightly expands the blank and makes it easy for the introduction of the receptacle portion of the carton.

In order to finish the box after the movement of the same by the ejector plates 68 and 68' upon the mandrel portion 84, the roller 86 is provided, this being termed the finishing roller. In order to properly operate this roller, the arm 87 which carries the same is keyed upon the short shaft 88 so that the arm 89 of said arm or lever 87 will be pulled downward by the spring 90 and consequently hold the finishing roll 86 upward. In order to positively move the said roller 86 downwardly upon the mandrel during the finishing of the envelop, the arm 91, connected to the shaft 88, has its roller 92 in engagement with the cam 6 upon the main shaft 5. This cam is so constructed as to impart a positive movement against the action of the spring 90, and thus at the proper time place the finishing roller 86 into engagement with the exterior of the mandrel portion 84 and thus smooth or finish the receptacle or envelop before its final ejection.

In order to properly press the blank and adhesive strip 47 upon the portions 61 and 62 of the mandrel M during the twirling action and folding of the blank and strip thereupon, the roller 93 is carried in the free end of the lever or arm 94, which is keyed upon the shaft 95, which is above but out of line with the shaft 54, which actuates, as before stated, the roller 58. The arm 96 is keyed upon the shaft 95 and has a spring 97 attached thereto, which spring exerts a tension to hold the roller 93 up to and in engagement with the mandrel M, but in order to impart the desired movement to the roller 93, the arm 98, which is connected at the extreme end of the shaft 95, as viewed at the left in Fig. 1, is provided with a roller 99, which is held in engagement with the cam 12 by the pull of spring 97 and is thereby actuated by said cam during the rotation of the shaft 5.

The roller 58 is actuated through the medium of the shaft 54, as before described, which shaft 54 is controlled by the spring 57, which normally exerts a tension to hold the said roller upwardly and into engagement with the coacting roller 60, which is a fixedly journaled roller. In order to impart to the roller 58 the desired movement to and from the roller 60, the arm 102, connected to the extreme end of the shaft 54, as viewed in Fig. 1, carries the roller 103, which is in engagement at all times with the cam 11, which is the actuating cam for the roller 58.

From the description, it will be seen that, after the blank-and-adhesive-strip-feeding mechanism is operated, the mandrel being in the position, as clearly shown in Fig. 5, and the clamp 62 being spaced from the main portion 61, so that the forward end of the blank and adhesive strip is projected therebetween, as illustrated in Fig. 5, a rotary action is imparted to the mandrel, thus twirling the blank and strip thereupon while the cam 12, which actuates the forming roller 93, will impart an upward movement to said roller 93 and bring it into engagement at the proper time with the mandrel, thus rolling and properly folding the blank and adhesive strip about the forming portion of the mandrel during the two complete revolutions of the same. At the final rotation of the blank and strip and after the said adhesive strip has been cut, as will later appear, the cam 10 will cause the yoke 71 to be moved to the right, as viewed in Figs. 1, 2, and 7, thus moving the ejectors 68 and 68′ into engagement with the blank formed upon the mandrel, whose adhesive strip portion, as before stated, has been folded in by the folding blade 81 and upon the receiving portion of the mandrel, the cam 73 being released from the free end 72 of the rod 66, so as to permit the easy withdrawal of the flap impinged between the clamping portions of the mandrel.

The return of the ejecting plates 68 and 68′ is very rapid so as not to interfere with the introduction of the next blank and adhesive strip to the clamping portion of the mandrel, while after the blank has been placed upon the portion 84 of the mandrel the finishing roller 86 will be actuated to engage the same upon the portion 84 and thus roll out or crease the same before the final ejection of the finished blank over the enlarged end 85 of the mandrel, upon the next succeeding operation of the ejecting plates 68 and 68′.

*Paper-cutting mechanism.*—In order to cut the adhesive strips at the proper time, that is, after a strip 47 substantially twice the length of the blank B has been presented and about to be completed or wound upon the mandrel M, a standard 104 is mounted upon the said plate and has journaled in the upper end thereof a short shaft 105, which has keyed thereto a sleeve 106, which has formed integrally therewith the rearwardly extending arm 107, which is connected spring-tensionedly to the base plate 1 by means of the spring 108, said spring 108 having a tension to pull downwardly and thus lift the lever or arm 109 so that its roller 110 will be held in engagement at all times with the periphery of the operating cam 9, this operating cam 9 being provided with a periphery which at the proper time will permit the lifting of the knife carrying arm 111, so that the plate 112 carrying the blade 113 will introduce the cutting edge 114 upwardly and toward the fixedly journaled upper feeding roller 60. This cutting edge 114 is serrated to correspond to the irregular surface of the roller 60, so that the teeth of said serrations will enter the grooves of the roller 60, and thus properly perforate the paper, so that the continued pulling action of the mandrel will tear the paper while the blade is holding the same, the roller 58 being drawn into engagement with the paper so as to retain the remaining portion thereof while the next forward edge of the adhesive strip 47 is in proper position to be engaged by the next blank B as the latter is moved forwardly out of the hopper 19.

From the foregoing description taken in connection with the drawings, it is evident that with a machine constructed according to the present invention, that the blank B will be properly introduced into the gripping portion of the mandrel M and with it carry the adhesive strip 47, and by reason of the cam and spring actuated mechanisms, the said blank and adhesive strip will be properly wound or formed upon the mandrel, the blank being sufficiently long to permit a full rotation of the mandrel to complete the forming thereof, while the adhesive strip will continue to be wound upon the same for another complete revolution of the mandrel, to be properly severed at the proper time, and just prior to the ejection of the blank by the ejectors 68 and 68′.

The operation of the machine will be readily understood from the above and needs no further description.

While the machine of the present invention is primarily adapted for producing the enveloping portion of a sliding carton, yet it should be understood that, *mutatis mutandis*, same may be adapted for producing the neck portion of a carton.

I claim:

1. A box making machine having means for simultaneously feeding a blank and an adhesive covering strip, a rotary forming mandrel having a blank-engaging clamp and a final receiving portion for the blank, the clamping portion of said mandrel being disposed in the path to receive the forward edges of the blank and strip, means disposed to coact with the clamping portion of the mandrel to make the blank conform with the exterior of the mandrel, means for ejecting the formed blank from the clamping portion of the mandrel upon the final receiving portion of the mandrel, means coacting with the blank-receiving portion of the mandrel to finish the shaping thereof before the final ejection of the completed blank from the mandrel, and means carried upon the extreme end of the mandrel for slightly expanding the completed blank as it is ejected from the mandrel.

2. A box making machine having means for simultaneously feeding a blank and an adhesive covering strip, a rotary forming mandrel disposed in the path to receive the blank and strip, said mandrel having a clamping portion to receive the forward edges of the blank and strip, means disposed to coact with the clamping portion of the mandrel to cause the blank and strip to conform to the contour of the mandrel during the rotation of the mandrel, an auxiliary blank-forming portion carried by the mandrel, means for ejecting the formed blank from the clamping portion of the mandrel to the auxiliary forming portion thereof, means disposed to coact with the auxiliary forming portion of the mandrel to complete the shaping of the blank, and means carried by the extreme end of the auxiliary forming portion of the mandrel for producing a flare to the formed blank.

3. In a box making machine, the combination, with a frame, a blank hopper and an adhesive strip retainer, a main shaft, and a feeding means operable from the main shaft for simultaneously feeding the blank and an adhesive strip, of a forming mechanism, comprising a counter shaft operably connected to the main shaft, a mandrel provided with primary blank-and-strip-forming portions, a strip-fold receptacle, and an auxiliary blank-finishing portion, means disposed to coact with the main portion of the mandrel to cause the blank and strip to conform to the contour thereof, means for operating same from the main shaft, means operably connected with the main shaft for coacting with the slot of the mandrel to fold the strip at one end of the blank, a reciprocatory ejecting means mounted upon the mandrel and disposed to move the completed blank from the main portion of the mandrel to the auxiliary portion thereof, and a finishing means operably connected to the shaft and in coactive relation to the auxiliary portion of the mandrel.

4. In a box making machine, means for feeding a blank, a rotary forming mandrel to receive the blank, means to cause the blank to conform to the exterior of the mandrel, means to secure the blank ends together, means to eject the blank from the mandrel, and means on the free end of the mandrel having its periphery tapered toward said free end of the mandrel for flaring the completed blank at the time the completed blank is ejected from the mandrel.

5. In a box making machine, means for feeding a blank that receives an adhesive covering strip, a rotary forming mandrel to wind the blank and strip thereabout, a strip guiding plate, a rigid support depending from said plate, a lever pivoted at its lower end to said support, means on the upper end portion of the lever to engage the strip, an arm pivoted to the upper end of the lever and having its lower end for coaction with said means on the upper end portion of the lever, and means connected to the upper end of said arm and to the blank feeding means for operating said arm from the latter.

6. In a box making machine, means for feeding a blank that receives an adhesive covering strip, a rotary forming mandrel to wind the blank and strip thereabout, a strip guiding plate, a rigid support depending from said plate, a lever pivoted at its lower end to said support, means on the upper end portion of the lever to engage the strip, a device on the lever for coöperation with said strip engaging means on the lever, and means to operate said device from the blank feeding means.

7. In a box making machine, means for feeding a blank that receives an adhesive covering strip, a rotary forming mandrel to wind the blank and strip thereabout, means to guide the strip, a device pivotally carried by the guiding means and having means thereon over which the strip engages, means associated with said pivoted device to clamp the strip to said strip engaging means, and means connected to said clamping means for operating same from the feeding means.

8. In a box making machine, means for feeding a blank, a rotary forming mandrel to receive the blank, means to cause the blank to conform to the exterior of the mandrel, means to secure the blank ends together, means to eject the blank from the mandrel, and a plate-like member having its edges inclined toward the mandrel and secured to the free end of the latter for expanding the completed blank upon the ejection of the blank from the mandrel.

9. In a box making machine, means for feeding a blank that receives an adhesive covering strip, a rotary forming mandrel to wind the blank and strip thereabout, a clamping device including pivoted means operated from the blank feeding means to feed the strip, and pivoted means to support the clamping device.

10. In a box making machine, means for feeding a blank that receives an adhesive covering strip, means to guide the strip, a rotary forming mandrel to wind the blank and strip thereabout, means operated from the blank feeding means to clamp the strip at a point above the guiding means and a pivoted device to support said clamping means to allow the latter to feed the strip.

11. In a box making machine, means for feeding a blank that receives an adhesive covering strip, means to guide the strip, a rotary forming mandrel to wind the blank and strip thereabout, means independent of the guiding means and operated from the blank feeding means to clamp and feed the strip, and a swingable support for said clamping and feeding means.

In testimony whereof I hereunto affix my signature in the presence of two witnesses.

OSCAR WILLIAM HANSON.

Witnesses:
CHAS. W. BENNETT,
E. E. RONDEBUSH.

Copies of this patent may be obtained for five cents each, by addressing the "Commissioner of Patents, Washington, D. C."